(12) United States Patent
Larsson (10) Patent No.: US 10,154,163 B2
(45) Date of Patent: Dec. 11, 2018

(54) DYNAMIC USER INTERFACE

(71) Applicant: MARKEM-IMAJE HOLDING, Bourge-les-Valance (FR)

(72) Inventor: Mattias Larsson, Gothenburg (SE)

(73) Assignee: MARKEM-IMAJE HOLDING, Bourg-lès-Valence (FR)

(*) Notice: Subject to any disclaimer, the term of this patent is extended or adjusted under 35 U.S.C. 154(b) by 0 days.

(21) Appl. No.: 15/396,984

(22) Filed: Jan. 3, 2017

(65) Prior Publication Data

US 2017/0118360 A1 Apr. 27, 2017

Related U.S. Application Data

(63) Continuation-in-part of application No. 14/129,683, filed as application No. PCT/IB2012/001684 on Jun. 29, 2012.

(Continued)

(51) Int. Cl.
| | |
|---|---|
| *B41J 3/46* | (2006.01) |
| *B41J 29/38* | (2006.01) |
| *H04N 1/00* | (2006.01) |

(52) U.S. Cl.
CPC .......... *H04N 1/00506* (2013.01); *B41J 3/46* (2013.01); *B41J 29/38* (2013.01); *H04N 1/0044* (2013.01);
(Continued)

(58) Field of Classification Search
CPC ......... B41J 3/46; B41J 29/38; H04N 1/00506; H04N 1/0044; H04N 1/00503; H04N 2201/0082
See application file for complete search history.

(56) References Cited

U.S. PATENT DOCUMENTS

| 6,116,716 | A | * | 9/2000 | Tajika | B41J 2/04563 |
| | | | | | 347/19 |
| 2004/0252150 | A1 | | 12/2004 | Iwata | |
| 2008/0017619 | A1 | * | 1/2008 | Yamakawa | B23K 26/03 |
| | | | | | 219/121.81 |
| 2010/0060909 | A1 | * | 3/2010 | Conescu | G06F 3/1204 |
| | | | | | 358/1.9 |

FOREIGN PATENT DOCUMENTS

| CN | 1828518 A | 9/2006 |
| CN | 1921547 A | 2/2007 |

(Continued)

OTHER PUBLICATIONS

English translation of Chinese Office Action in corresponding Chinese Patent Application No. 201280031872.3 dated Sep. 14, 2015.

(Continued)

*Primary Examiner* — Geoffrey Mruk
*Assistant Examiner* — Scott A Richmond
(74) *Attorney, Agent, or Firm* — Renner, Otto, Boisselle & Sklar, LLP (57) ABSTRACT

A method for providing a dynamic user interface template in an industrial printing environment. The method including automatically determining: a print-head type, a utilized printing technology module, and a peripheral module. The method obtains from said print head information on one or several of technology type and capabilities, setting definition, fault and warning definitions, maintenance features and diagnostic features. The method also obtains from said printing technology module information on one or several of module type and capabilities, setting definition, fault and warning definitions, maintenance features and diagnostic features. The method additionally obtains from said peripheral module information on one or several of module type and capabilities, setting definition, fault and warning definitions, maintenance features and diagnostic features. Based on said obtained information, the method dynamically con- (Continued)

figures at least one changeable portion of a user interface template based on the print-head type, utilized printing technology and print technology capability.

29 Claims, 9 Drawing Sheets

Related U.S. Application Data (60) Provisional application No. 61/502,352, filed on Jun. 29, 2011.

(52) U.S. Cl.
CPC . *H04N 1/00503* (2013.01); *H04N 2201/0082* (2013.01)

(56) References Cited

FOREIGN PATENT DOCUMENTS

| EP | 0 780 236 | 6/1997 |
|---|---|---|
| EP | 1 443 391 | 8/2004 |

OTHER PUBLICATIONS

International Search Report, corresponding to PCT/IB2014/001684, dated Dec. 6, 2012.
International Search Report, corresponding to PCT/IB2014/001684, dated Aug. 12, 2013.

* cited by examiner

DYNAMIC USER INTERFACE

RELATED APPLICATIONS

This application is a continuation in part of application Ser. No. 14/129,683 filed on Apr. 16, 2014, that is a National Stage Entry of PCT/IB2012/001684 filed on Jun. 29, 2012, that claims the benefit of 61/502,352 filed on Jun. 29, 2011. All of which are herein incorporated by reference in their entirety.

TECHNICAL FIELD

Example embodiments presented herein are directed towards a dynamic user interface capable of adaption for providing printing information for various types of printing technologies.

BACKGROUND

In an industrial printing environment, numerous printers are typically configured to simultaneously print information on various types of items. One example of an industrial printing environment may be the printing of labels on various types of packages or consumer goods. Consumer goods require a great deal of product identification (e.g., expiring dates, traceability data, etc.). The information to be printed may vary from one item to another, from one batch of similar items to another, from one site or time of manufacture to another, and/or from one type of print technology to another.

Each printing technology typically has two basic components, a print-head and a corresponding controller. The controller can be situated locally, or close to the print-head. The controller may also be remotely situated. Remote controllers may be shared or used to control several print-heads. The controller may often comprise a user interface which may provide an operator with a current printing status and/or other printing related information.

SUMMARY

The print, image, and/or formatting specifications, and/or printing status and related information may differ with different forms of print technologies. Thus, the type of information which is provided through a user interface, and how this information is displayed, may differ as a result of the different forms of print technologies. Furthermore, based on the printing technology being utilized, a user interface may provide different functionality.

For example, a user interface associated with an ink-jet printer may provide information relating to a current ink supply, whereas a user interface associated with a thermal based print technology may provide information relating to a temperature of the printer head. Currently, printing related user interfaces are typically static and are therefore designated for a specific type of print technology.

Thus, a need exists for a user interface associated with a single controller which is capable of providing information, functionality, and/or status updates relating to various printing technologies. Thus, at least one object of some of the example embodiments presented herein may be to provide a dynamic and adaptable user interface capable of providing printing information for various types of printing technologies.

Some of the example embodiments may be directed towards a method for providing a dynamic user interface. The method may comprise determining a print-head type. The method may further comprise dynamically configuring at least one changeable portion of a user interface template based on the print-head type.

According to some of the example embodiments, the determining the print-head type may further comprise receiving a print-head identification from a connecting print-head.

According to some of the example embodiments, the determining the print-head type may further comprise receiving a print-head identification from a designated head connector.

According to some of the example embodiments, the determining the print-head type may further comprise receiving a voltage reading associated with a print-head connection, and determining the print-head type may be based on a value of the voltage reading.

According to some of the example embodiments, the determining the print-head type may further comprise receiving a user provided identification information.

According to some of the example embodiments, the dynamically configuring may further comprise retrieving at least one module based on the print-head type and applying the at least one module to the at least one changeable portion of the user interface template.

According to some of the example embodiments, the retrieving may further comprise retrieving the at least one module, wherein the at least one module may provide a layout of graphical components and/or functionality of the at least one changeable portion of the user interface template.

According to some of the example embodiments, the retrieving may further comprise retrieving at least one module, wherein the at least one module may provide at least one of data source, user operational, and/or user interface management functionality.

According to some of the example embodiments, the retrieving may further comprise retrieving the at least one module, wherein the at least one module may comprise at least one sub-module.

According to some of the example embodiments, the retrieving may further comprise retrieving the at least one module from a database based on the print-head type.

According to some of the example embodiments, the retrieving may further comprise retrieving the at least one module from a connecting print-head.

According to some of the example embodiments, the retrieving may further comprise retrieving the at least one module from a user provided source.

Some example embodiments may be directed towards a printing display unit. The printing display unit may comprise a print-head manager that may determine a print-head type. The printing display unit may further comprise a modulation unit that may dynamically configure at least one changeable portion of a user interface template based on the print-head type.

According to some of the example embodiments, the unit may be configured to perform any of the method steps described above.

Some of the example embodiments may be directed towards a computer readable storage medium encoded with computer executable instructions, wherein the instructions, when executed by a printing display unit, may perform any of the method steps described above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Currently, many printing related user interfaces are static. These static interfaces are typically designed to provide printing related information and functionality for a single type of printing technology. Thus, the graphical layouts of the static interfaces remain the same and are not suitable for various forms of printing technologies.

Thus, a need exists for a user interface capable of displaying different forms of printing information. Some example embodiments presented herein are directed towards a system, and corresponding method, for a dynamic and adaptable user interface for providing print related information and/or functionality for various forms of print technologies.

Figure 1:
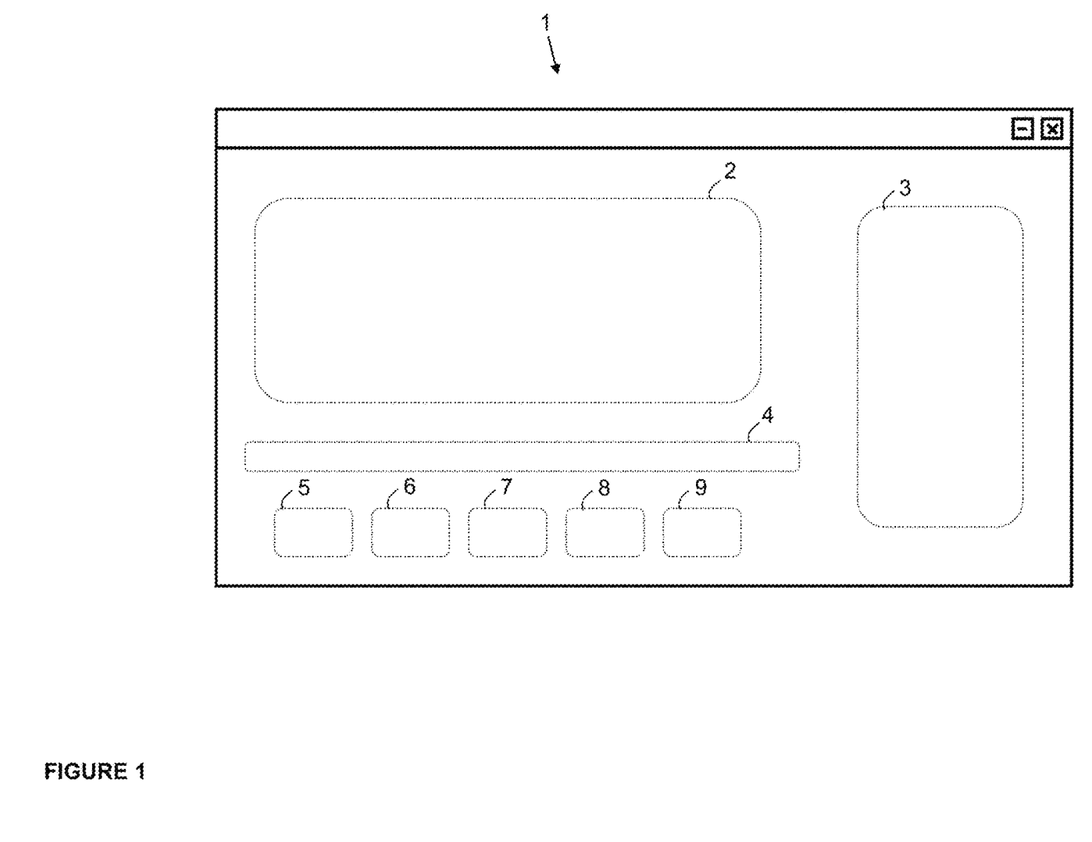
FIG. 1 is a schematic of a dynamic user interface template, according to some of the example embodiments.

FIG. 1 illustrates an example of a dynamic user interface template 1. The portions of the dynamic user interface template highlighted by dashed lines may represent changeable portions of the template. These changeable portions may differ depending on the printing technology being utilized. The printing technology may be determined by a detected or provided print-head type. Once a print-head has been connected to the controller, the dynamic user interface template 1 may be altered depending on the print-head type.

Based on the print-head type, the type of data displayed, the graphical layout of the data, and/or the interface functionality may be changed. For example, the template 1 may comprise a viewing section 2 where a printing preview or status may be displayed. Depending on the print-head type, the retrieval of the displayed information may be from different data sources. Furthermore, the type of data and how the data is displayed may also differ with different print-head types or printing technologies.

The dynamic user interface template 1 may also comprise a second viewing window 3. For some print technologies the second window 3 may be used to display additional printing related information. The second window 3 may also comprise various dropdown menus providing a user a choice among a variety of operational or viewing options.

The dynamic template 1 may also comprise a status bar 4 which may be used to provide additional printing information. The dynamic template 1 may further comprise action buttons 5-9, in which a user may choose an action or printing option. It should be appreciated that the dynamic user interface template of FIG. 1 is presented merely as an example and a dynamic user interface template according to the example embodiments may take any form or layout.

In adapting the user interface template to the detected print-head type, any number of modules may be associated with the changeable portions of the template. Modular programming is a software design technique in which software may be composed of separate, interchangeable components, called modules. By breaking down program functions into modules, each module may accomplish any number of functions and comprise everything necessary to accomplish this.

With respect to some of the example embodiments presented herein, any number of modules may correspond to any number of changeable portions of the dynamic user interface template 1. It should further be appreciated that a module may comprise any number of sub-modules. The modules may affect, for example, the graphical layout of the user interface, the information viewed and/or provided by the user interface, the user operational options, and/or the data sources utilized by the user interface.

Some examples of functionality or information which may be supplied by a module may be supply management information, print editing functionality, printer adjustment capabilities. Furthermore, modules may also modules may also provide, for example, functionality related to the presentation of a printer status, printer state model, printer parameters, printer counters, printer control functions, date and time information, menu structure, head operations, etc. The module functionalities provided above are done so merely for the purpose of example. It should be appreciated that any number of modules may be provided to describe anything that may be displayed or provided by a user interface.

It should also be appreciated that the module associations with respect to print technology may be updatable user programmable associations.

Figure 2:
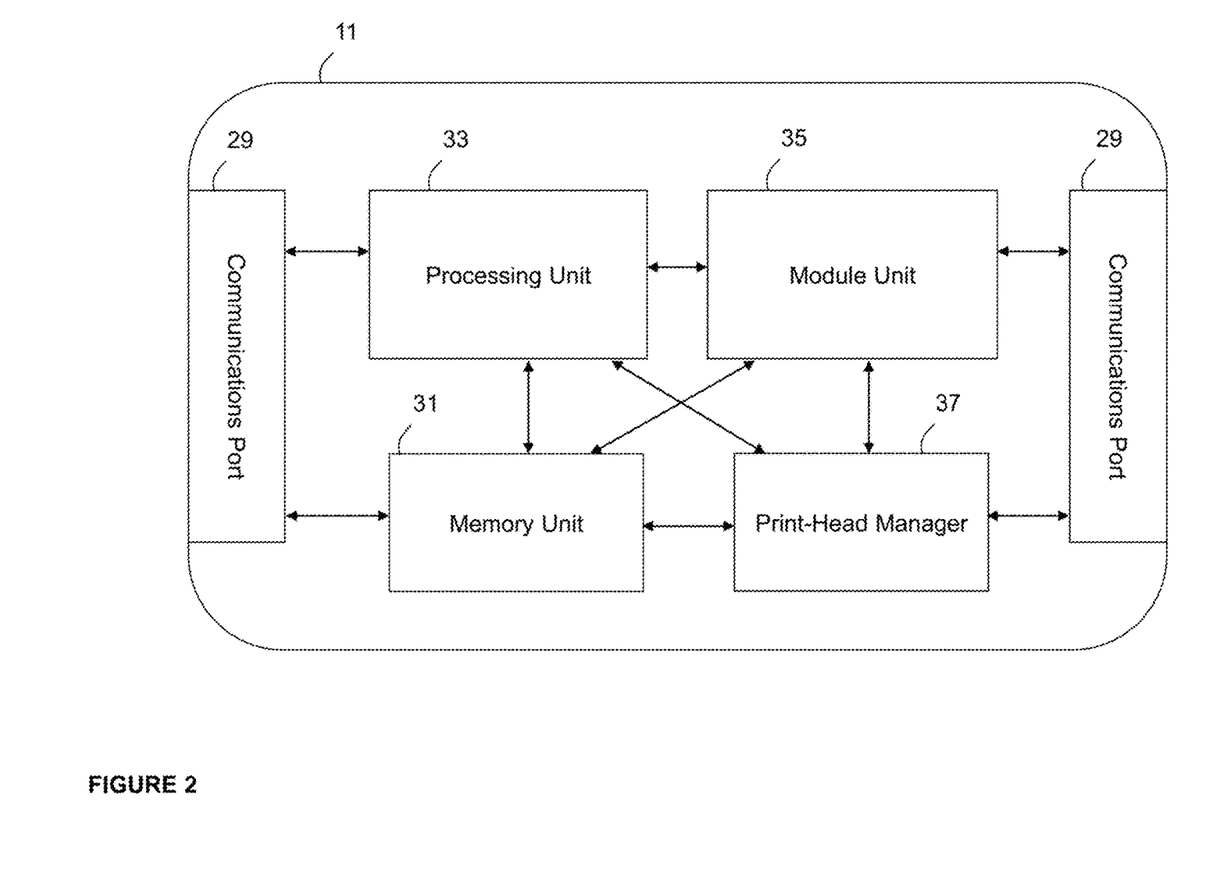
FIG. 2 is a schematic of a universal printing controller, according to some of the example embodiments.

FIG. 2 illustrates simplified example of a printing display unit 11 which may be utilized in conjunction with the dynamic interface, according to some of the example embodiments. The printing display unit 11 may comprise any number of communication ports 29 that may be able to transmit or receive any number or type of signals, data, and/or instructions. It should be appreciated that the printing display unit 11 may alternatively comprise a single transceiver port. It should further be appreciated that the communication ports 29 or transceiver port may be in the form of any input/output communications port known in the art.

The printing display unit 11 may also comprise at least one memory unit 31. The memory unit 31 may be configured to store received, transmitted, and/or measured data and/or executable program instructions. The memory unit 31 may be any suitable type of computer readable memory and may be of volatile and/or non-volatile type.

The printing display unit 11 may also comprise a print-head manager 37 that may be configured to detect communication with a connected print-head. Print-heads from printers of various printing technologies may be connected to the printing display unit 11 via a connection port.

The printing display unit 11 may further comprise a general processing unit 33. The printing display unit 11 may also comprise a module unit 35. The module unit 35 may be configured to retrieve associated modules and alter changeable portions of a user interface template based on a print-head type.

It should be appreciated that the general processing unit 33, module unit 35, and the print-head manager 37 need not be comprised as separate units. These units may be comprised as a single unit or any number of units. Furthermore, the general processing unit 33, module unit 35, and the print-head manager 37 may be any suitable type of computation unit, e.g. a microprocessor, digital signal processor (DSP), field programmable gate array (FPGA), or application specific integrated circuit (ASIC).

Figure 3A:
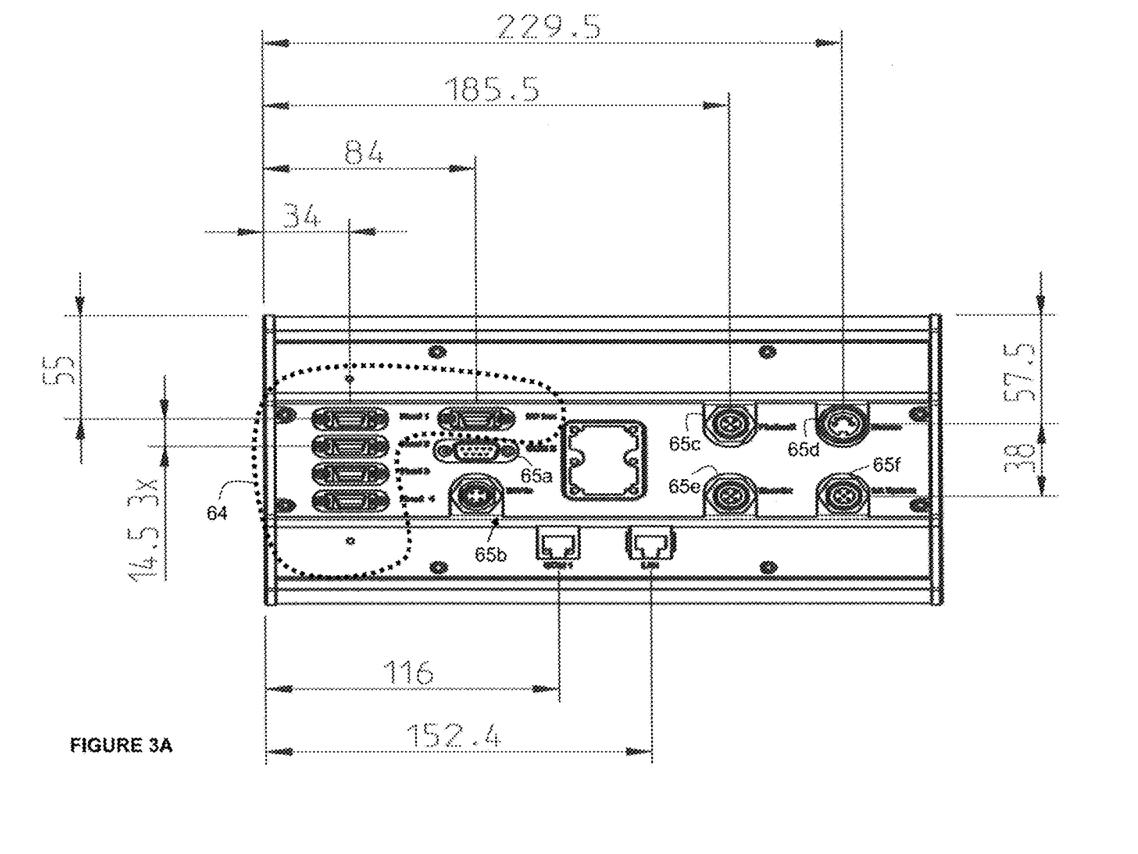
FIGS. 3A and 3B are schematics of example multiple print-head connection ports of the controller of FIG. 2, according to some of the example embodiments.

FIG. 3A illustrates an example of a print-head connection port. The print-head connection port may feature any number of print-head connections. Any number of the print-head connections may be of a same type or shape, as illustrated by the print-head connection group 64. It should be appreciated that the print-head connectors of group 64 may be dedicated print-head connectors, which may be configured to connect with a print-head of a specific type. Thus, detection of the print-head type may be performed by determining which print-head connector is connected to a print-head.

Alternatively, the print-head connectors of group 64 may be configured to connect to any type of print-head, despite being of a same shape or type. Such print-head connectors may be referred to as universal print-head connectors. In such a configuration, print-head detection may be determined, for example, by information supplied by the print-head and/or by voltage analysis, which will be described in greater detail below. FIG. 2A further provides examples of print-head connectors 65*a*-65*f* of different types and shapes. It should be appreciated that any number of the print-head connectors 65*a*-65*f* may be dedicated or universal type print-head connectors.

Figure 3B:
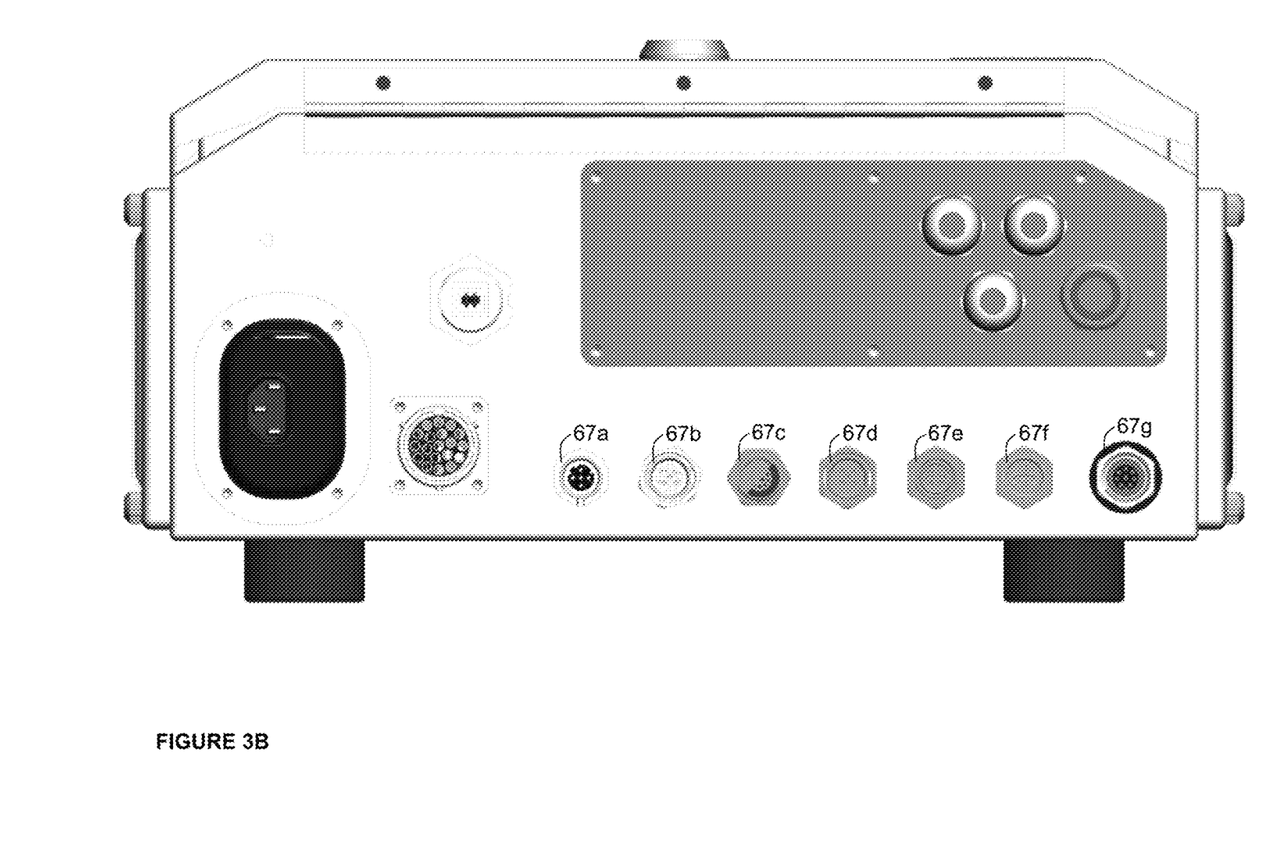

FIG. 3B provides an additional example of a print-head connection port. Any number of the print-head connectors 67*a*-67*g* may be dedicated or universal print-head connectors. It should be appreciated that the connection ports of FIGS. 3A and 3B are provided merely as examples. The connection ports may comprise any number of connectors suitable for connecting to any number of print-heads of different technologies, and may be of any dimension, shape or type.

Some of the various print technologies which may be used in conjunction with the printing unit 11 may be, but are not limited to; vector, raster, and/or Radio Frequency Identification (RFID) type print technologies. Specifically, these technology types may comprise laser, thermal transfer, direct thermal transfer, valve jet, continuous ink jet, bubble jet, and/or piezoelectric type printers. It should be appreciated that the example embodiments presented herein may be applied to any type of printing technology. It should also be appreciated that the identification of a printing technology may be referred to herein as a print-head type.

Figure 4:
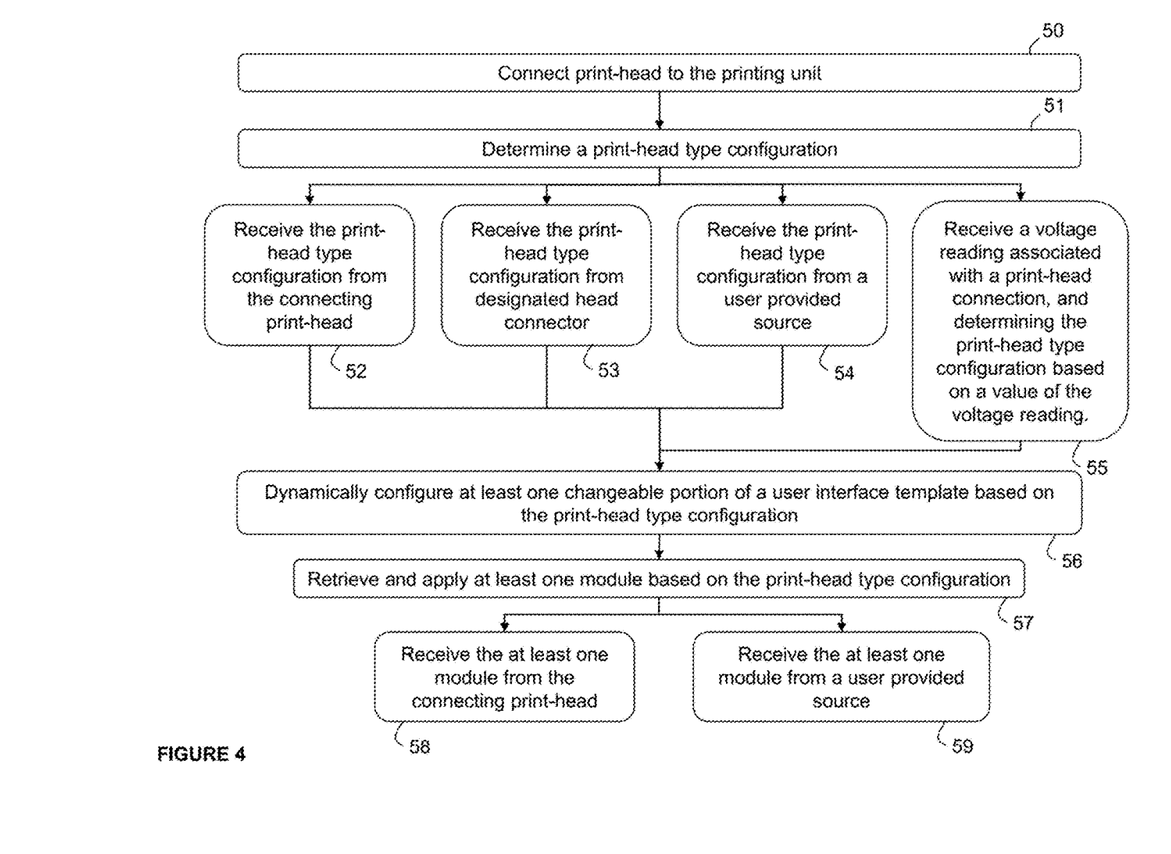
FIG. 4 is a flow diagram depicting example operations that may be taken by the universal printing controller of FIG. 2, according to some of the example embodiments.

FIG. 4 illustrates a flow diagram depicting example operations which may be taken by a printing display unit 11, according to some of the example embodiments. In operation, a print-head may be connected to the printing display unit 11 (50). Once a connection has been detected, a print-head manager 37 may be utilized in determining a print-head type (51).

In some example embodiments, the print-head type may be determined by receiving the print-head type from the connection print-head (52). For example, the print-head connector may comprise a readable memory where instructions and identification information may be stored. Thus, upon connection, the print-head connector may transmit print-head identification information through, for example, the communication ports 29.

In some example embodiments, the print-head type may be determined by receiving the print-head type from a designated head connector (53). As previously discussed, at least a subset of the various connection ports of the printing display unit 11 may be designated ports. Thus, according to some example embodiments, a designated port may only be configurable to be connected to the print-head type associated with the designation. Therefore, upon detecting a connection to a designated port, the print-head manager 37 may determine the print-head type of the connecting print-head.

In some example embodiments, the print-head type may be determined by receiving the print-head type from a user provided source (54). For example, a user may provide the print-head type via a user interface. In other example embodiments, the user may provide the print-head type by uploading such information via a computer readable medium or a network server.

In some example embodiments, the print-head type may be determined by receiving a voltage reading associated with a print-head connection. The print-head type may thereafter be determined based on a value of the voltage reading (55). Different types of print technologies may require different amounts of power or voltage. Thus, by measuring the voltage associated with a connection print-head, the determination of the print-head type may be made. It should be appreciated that the print-head manager 37 may retrieve a comparison voltage reading for the memory unit 31 or any other unit or database featuring stored information. It should further be appreciated that a user may program or enter respective voltage values for various print technologies in the printing display unit 11. It should be appreciated that the methods for print-head type retrieval provided above are merely examples. Any other forms of print-head type retrieval known in the art may also be utilized.

Once a determination of the print-head type has been made; at least one changeable portion of the user interface template may be dynamically configured based on the print-head type (56). The dynamic configuration may be performed by the processing unit 33 and/or the module unit 35. The dynamic configuration may comprise retrieving and applying at least one module based on the print-head type (57).

The retrieval may comprise receiving the at least one module from the connecting print-head (58). As discussed above, the print-head connector may comprise a readable memory where any number of modules may be stored. Thus, upon connection, the print-head connector may transmit the at least one module through, for example, the communication ports 29. Modules retrieved from the connecting print-head may comprise any form of data or user interface operations. For example, the connecting print-head may provide supply management information.

The retrieval may also comprise receiving the at least one module from a user provided source (59). The user provided source may be in the form of an input provided by the user through the interface, information provided by a server, a user provided database entry, or any other user provided information source known in the art. The retrieval may also comprise retrieving the at least one module from a database. The database may be a print technology specific database; such that modules associated with a particular print technology may be stored in an associated database. It should be appreciated that multiple methods, or data sources, for retrieval may be employed simultaneously for different portions of the same dynamic user interface.

Figure 5A:
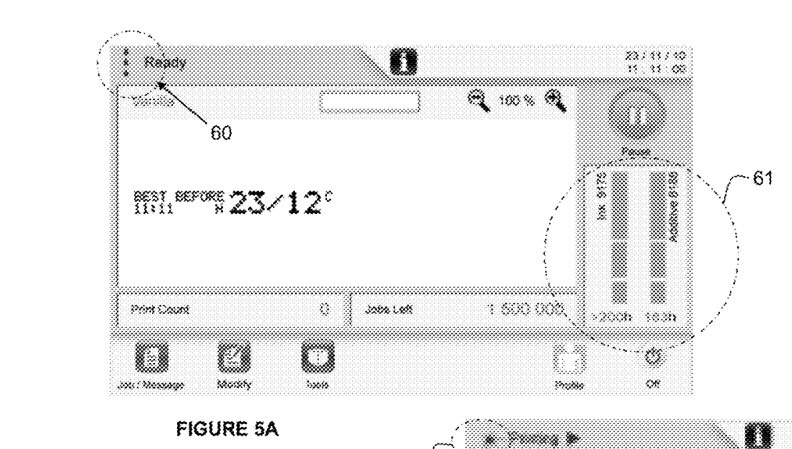
FIGS. 5A and 5B are illustrative examples of a dynamic user interface, according to some of the example embodiments.

FIGS. 5A and 5B illustrate examples dynamic user interfaces, according to some of the example embodiments. In the example provided by FIG. 5A the detected print-head type is an ink jet print technology. Thus, the dynamic user interface may comprise, for example, a print-type identifier 60 informing the user of the print technology associated with the current user interface. The dynamic user interface may also comprise a status window 61 which may provide current ink levels associated with the ink jet print-head.

Figure 5B:
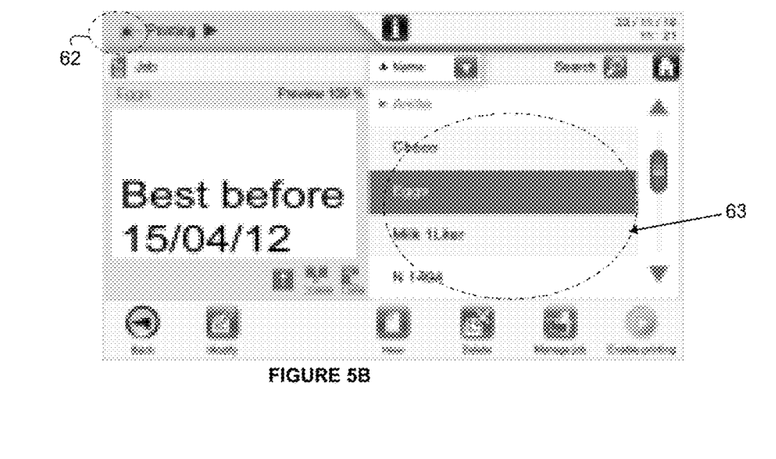

In the example provided by FIG. 5B, the detected print-head type may be a laser print technology. The dynamic user interface of FIG. 5B may also comprise, for example, a print-type identifier 62 informing the user of the print technology associated with the current user interface. The user interface of FIG. 5B may also comprise a dropdown menu 63 associated with the current print technology.

It should be appreciated that according to some example embodiments, the display of the printing unit 11 may be configured to simultaneously display multiple dynamic user interfaces, wherein the multiple dynamic user interfaces may be associated with different print technologies or different print-heads. The multiple dynamic user interfaces may be displayed in a cascade or tiled manner.

Figure 6:
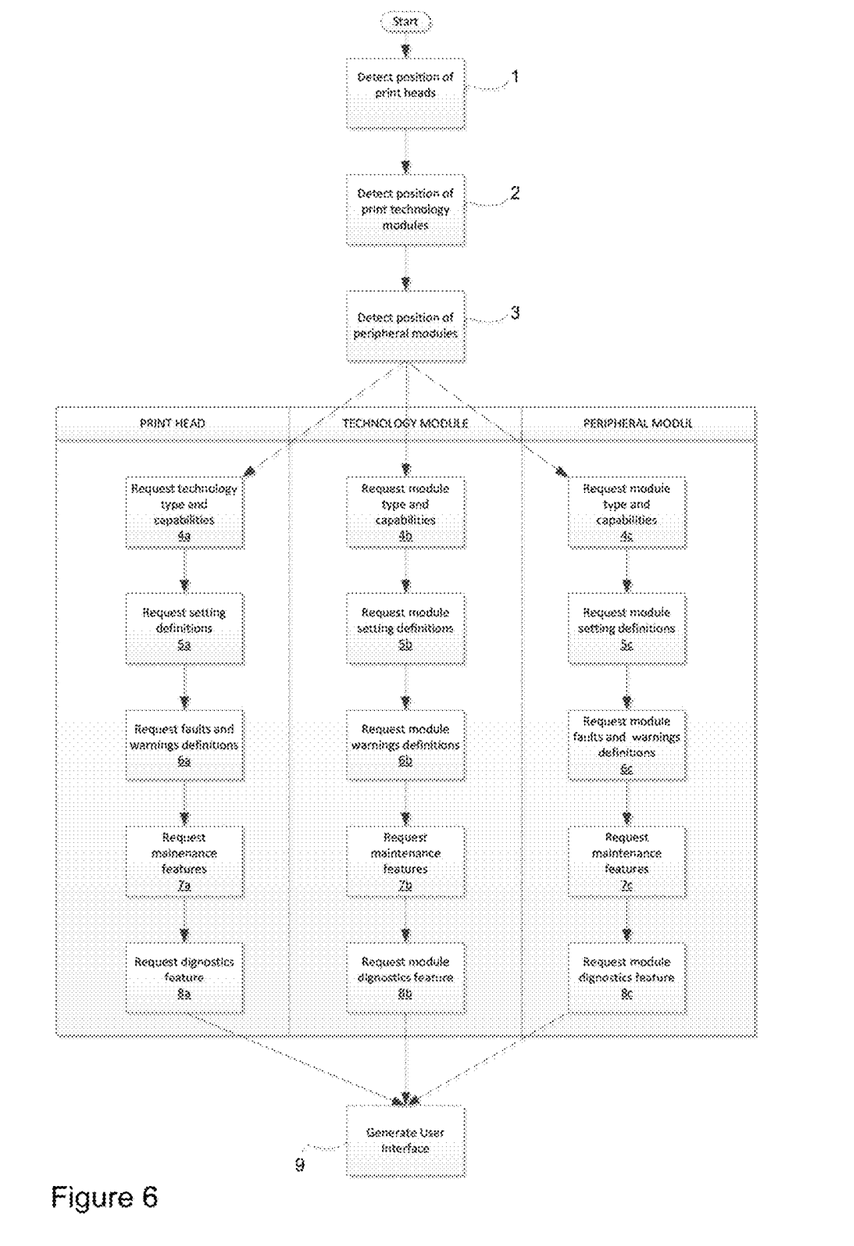
FIGS. 6 and 7 illustrate activity diagrams in more detail depicting example operations which may be taken by the printing display unit, according to some of the example embodiments.
Figure 7:
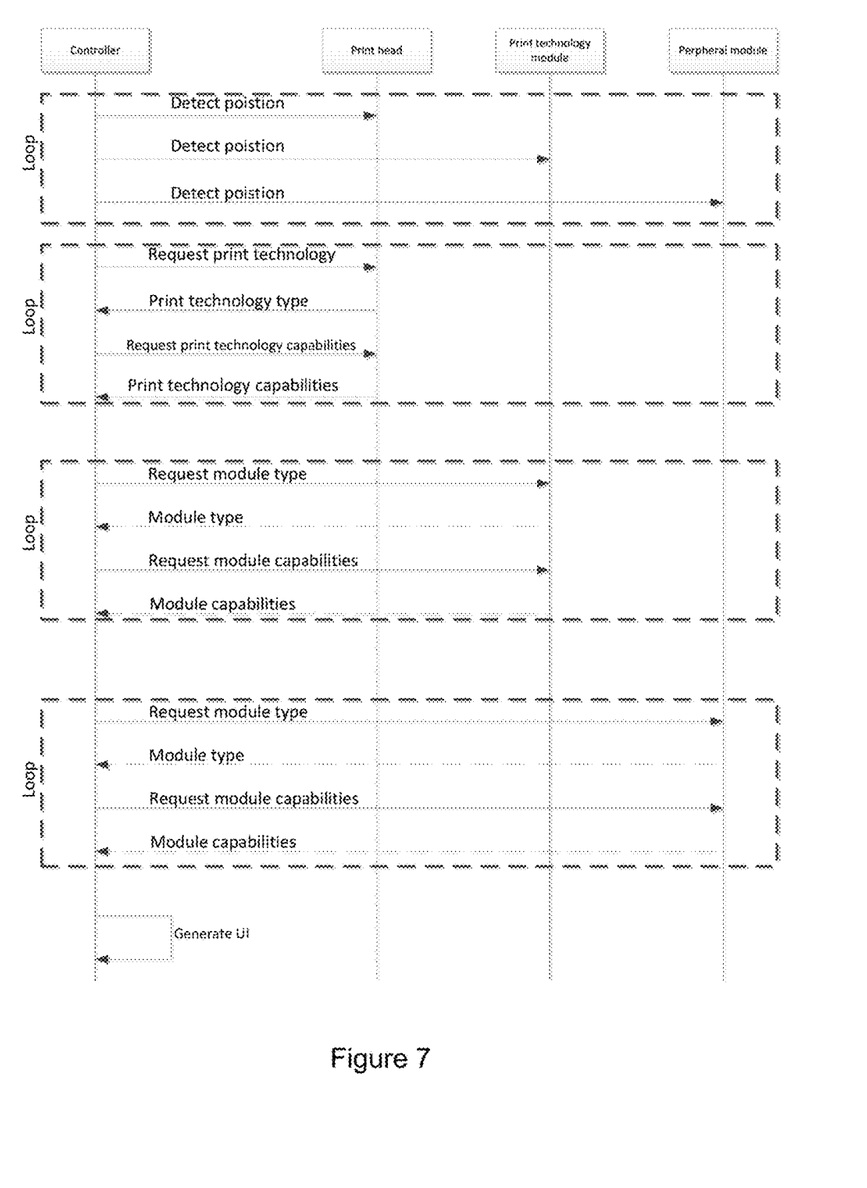

FIGS. 6 and 7 illustrate activity diagrams in more detail depicting example operations which may be taken by the printing display unit, according to some of the example embodiments. Controller in FIG. 7 refers to the general processing unit 33 of the printing display unit 11.

The diagram shows that the three activities can be done in parallel: print head detection, technology module detection and peripheral module detection. The activities include steps:
1. Detecting position of the print head; controller sends request to print head;
2. Detecting position of print module technology; controller sends request to print technology module;
3. Detecting position of peripheral modules; controller sends request to peripheral module;

Depending on the detected technology or module:
4. a-c: Technology or module type and capabilities are requested;
5. a-c: Setting definitions are requested;
6. a-c: Faults and warnings or module warning definitions are requested;
7. a-c: Maintenance features are requested;
8. a-c: Diagnostic or module diagnostic features are requested;
9. Based on the responses obtained the user interface is generated.

In steps 1-3 position of print heads and modules are determined, e.g. print head 1, print head 2, . . . , technology module 1, technology module 2, etc. to identify the location when multiple modules are plugged in. the detection may be automatically.

According to the invention, there can be one or more print heads attached to the same controller. The print heads can belong to same or different technology types, such as:

Continuous Inkjet (CU);
Thermal Inkjet (TIJ);
Thermal;
Hotmelt;
Laser;
Valvet-jet;
Etc.

Moreover the print heads can have different capacities, for example:
Marking capabilities, vector based (laser), dot based (in drops), bitmap based (thermal print heads);
Resolution;
Dot size;
Laser power, e.g. 10 W, 30 W, 50 W, etc.;
Laser focal distance, e.g. 10 cm, 1 m, etc.;
Ink jet drop throw distance, e.g. 5 mm, 10 mm, etc.;
Ink jet drop throw speed;
Ink type support, e.g. solvent types, pigments (e.g. some pigment molecules are larger);
Print head orientation detection;
Print head status indicator for safety.

There can be one or more technology modules connected to the controller, each module can have different capabilities and there can be multiple modules of the same type installed, they are differentiated through the position detection.

Print technology modules may comprise, e.g.:
Ribbon cassette: information on ribbon type, ribbon length, ribbon remaining;
Ink and solvent circuit; capacity of ink supply, capacity of solvent supply, type of ink, type of solvent, pressure levels;
Ink cartridge, capacity of cartridge, number of cartridges, level of ink in each cartridge, ink type in each cartridge;
Fume extractor, capacity of extractor, filter level, service intervals, last service;
Print and Apply Application; pneumatic or electric actuator, wipe, tamp, blow, tamp and blow;
Faults and warnings;
Maintenance instructions;
Service instructions.

Peripheral modules may comprise, for example:
Stack light;
Packaging line controller;
I/O interface.

The responses may include an artwork, e.g. icons, images or video for faults and warnings, settings, maintenances, and diagnostics. The artwork, manuals, instructions for a print head/module may alternatively be retrieved from a central server or a "cloud server" (not illustrated).

Maintenance instructions may comprise, e.g.:
Print head/module maintenance instructions;
Print head/module maintenance logs;
Print head/module service intervals;
Print head purge function; and
Print head cleaning mechanism.

It is obvious that the above mentioned steps 1-3 and 4-8 may be executed in another order.

Figure 8:
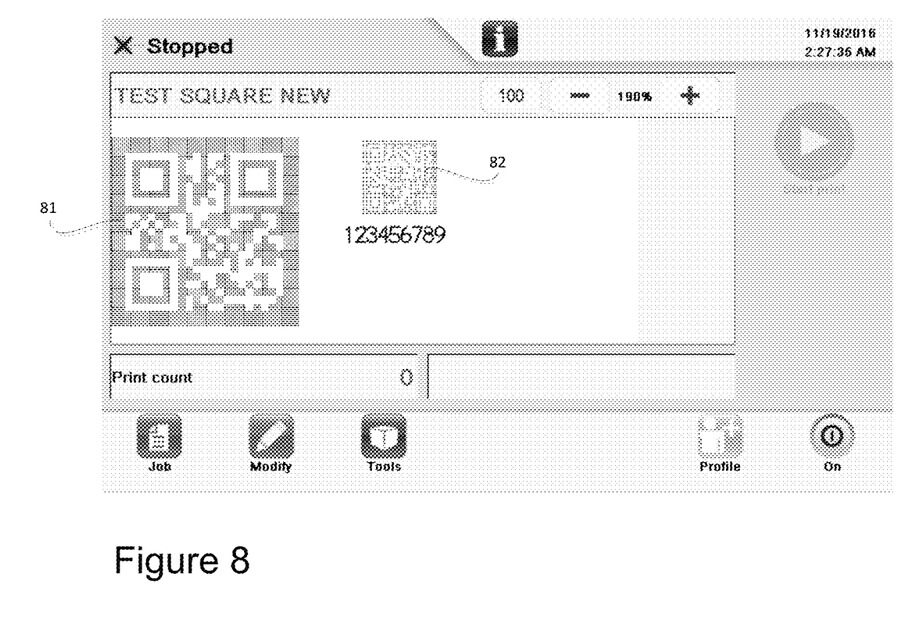
FIG. 8 is an exemplary preview on the dynamic user interface for a laser printer, according to one exemplary embodiment the present invention.

FIG. 8 is an exemplary preview on the dynamic user interface for a laser printer, according to one exemplary embodiment the present invention. The preview is updated to match how the laser generates marks on a substrate (e.g. paper). According to this example, a QR-code for printing is displayed on the display. The QR-code 81 on the left comprises four dots per cell and the QR-code 82 on the right comprises one dot per cell. Both variants of the QR code are intended as an illustration to show the differences on how industrial laser can mark a QR code and display it on the user interface. This can be compared to how it is drawn on a bitmap based printer or on a regular office printer which has completely filled square black marks. Thus, the preview of the numbers also reflects how it is printed using the laser technology. Consequently, the dynamic display of the invention may also be employed for:
  Job preview is modified based on the print technology, e.g.:
    resolution, dot size, bitmap based or vector based, multi drop where each pixel is marked with multiple small dots
    barcodes can be drawn differently depending on print technology, e.g. a CIJ and Laser would print a 2D code differently where the CIJ would fire round dots to create the pattern and the laser would draw an X or a / to create the 2D barcode pattern.
  Consumables, e.g.:
    the type of consumable is displayed based on the print technology ink bottles, solvent bottles, cartridges, cassettes, tanks, filter
    the number consumables is displayed is dynamically modified 1, 2 . . . 15 consumable cartridges
  Technology on/off button:
    some technologies does not have an on/off, e.g. an ink jet printer must start the jets, a laser need to warm up the laser tube, whereas a TIJ does not have any start-up
  Adjustments:
    Adjustments differ per technology, e.g. a laser can position of the print within the laser aperture in all direction, power level, dwell time, atomization pattern can be adjusted whereas on a CIJ the position can only be adjusted horizontally, no power level adjustment or dwell time, but the dot algorithm could be adjusted which control the sequence of firing the dots and timing to optimize the print quality
  Diagnostics:
    Diagnostics depends on the print technology and controller capabilities and are dynamically displayed
  Settings:
    Settings depends on the print technology and controller capabilities and are dynamically displayed It should also be appreciated that a single module may comprise any number of sub-modules. Furthermore, it should be appreciated that a module may provide the generation of any number of additional user interfaces. For example, a module may provide any number of sub-menus which may appear in the form of pop-up windows.

The above mentioned and described embodiments are only given as examples and should not be limiting to the present invention. Other solutions, uses, objectives, and functions within the scope of the invention as claimed in the below described patent claims should be apparent for the person skilled in the art.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be comprised within the scope of this disclosure. Although specific terms may be employed herein, they are used in a generic and descriptive sense only and not for purpose of limitation.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVD), flash memory, EEPROM, etc. Generally, program modules may comprise routines, programs, objects, components, data structures, etc. that performs particular tasks or implement particular abstract data types. Computer-executable instructions, associated data structures, and program modules represent examples of program code for executing steps of the methods disclosed herein. Such instructions may be executed by the processing unit, e.g., central processing unit, microcontroller, microprocessor, field programmable gate array, application specific integrated circuit, digital signal processor, etc. The particular sequence of such executable instructions or associated data structures represents examples of corresponding acts for implementing the functions described in such steps or processes.

I claim:
1. A method for providing a dynamic user interface template in an industrial printer comprising a processing unit, the method comprising:
  automatically determining by said processing unit:
    a print-head type connected to a printing display unit in connection with a printing controller and comprising a module configured to retrieve associated modules; wherein the module is further configured to affect one or more of graphical layout of a user interface, information viewed, provided by the user interface, user operational options, data sources utilized by the user interface; and
    a utilized printing technology module based on the print-head type;
  obtaining from said print-head information on the one or several of technology type and
  obtaining from said print head information on one or several of technology type and capabilities, setting definition, fault and warning definitions, maintenance features and diagnostic features,
  obtaining from said printing technology module information on one or several of module type and capabilities, setting definition, fault and warning definitions, maintenance features and diagnostic features, and
  obtaining from said module information on one or several of module type and capabilities, setting definition, fault and warning definitions, maintenance features and diagnostic features,
  based on said obtained information automatically configuring by said module configured to retrieve associated modules at least one changeable portion of a user interface template based on the print-head type, utilized printing technology and print technology capability, wherein the at least one changeable portion is related to a display of a printing preview or a printing status.

2. The method of claim 1, wherein the determining the print-head type further comprises receiving a print-head identification from a connecting print-head.

3. The method of claim 1, wherein the determining the print-head type further comprises receiving a print-head identification from a designated head connector.

4. The method of claim 1, wherein the determining the print-head type further comprises receiving a voltage reading associated with a print-head connection, and determining the print-head type based on a value of the voltage reading.

5. The method of claim 1, wherein the determining the print-head type further comprises receiving a user-provided identification information.

6. The method of claim 1, wherein the dynamically configuring further comprises retrieving at least one module based on the print-head type and applying the at least one module to the at least one changeable portion of the user interface template.

7. The method of claim 6, wherein the retrieving further comprises retrieving the at least one module, wherein the at least one module provides a layout of graphical components and/or functionality of the at least one changeable portion of the user interface template.

8. The method of claim 6, wherein the retrieving further comprises retrieving at least one module, wherein the at least one module provides at least one of data source, user operational, and/or user interface management functionality.

9. The method of claim 6, wherein the retrieving further comprises retrieving the at least one module, wherein the at least one module comprises at least one sub-module.

10. The method of claim 6, wherein the retrieving further comprises retrieving the at least one module from a database based on the print-head type.

11. The method of claim 6, wherein the retrieving further comprises retrieving the at least one module from a connecting print-head.

12. The method of claim 6, wherein the retrieving further comprises retrieving the at least one module from a user provided source.

13. The method of claim 1, wherein the preview further comprises updating said display portion to match how a laser in a laser printer type generates marks on a substrate.

14. The method of claim 13, wherein the display is configured to display a QR-code on the display with a number of dots printed, reflecting how it is printed using laser technology.

15. A printing display unit for industrial printing, the printing display unit comprising:
a print-head manager adapted to automatically determine:
a print-head type connected to the printing display unit in connection with a printing controller and comprising a module configured to retrieve associated module; wherein the module is further configured to affect one or more of graphical layout of a user interface, information viewed, provided by the user interface user operational options data sources utilized by the user interface; and
a utilized printing technology module;
obtaining from said print head information on one or several of technology type and capabilities, setting definition, fault and warning definitions, maintenance features and diagnostic features,
obtaining from said printing technology module information on one or several of module type and capabilities, setting definition, fault and warning definitions, maintenance features and diagnostic features, and
obtaining from said module information on one or several of module type and capabilities, setting definition, fault and warning definitions, maintenance features and diagnostic features,
a user interface template comprising at least one changeable portion;
modulation unit adapted to based on said obtained information dynamically configuring at least one changeable portion of a user interface template based on the print-head type, utilized printing technology and print technology capability, wherein the at least one changeable portion is related to a display of a printing preview or a printing status.

16. The printing display unit of claim 15, further comprising a communication port configured to receive a print-head identification from a connecting print-head, and the print-head manager is adapted to determine the print-head type based on the received print-head identification.

17. The printing display unit of claim 15, further comprising a communication port configured to receive a print-head identification from a designated head connector, and the print-head manager is adapted to determine the print-head type based on the received print-head identification.

18. The printing display unit of claim 15, further comprising a communication port configured to receive a voltage reading associated with a print-head connection, and the print-head manager is adapted to determine the print-head type based on a value of the voltage reading.

19. The printing display unit of claim 15, further comprising a communication port configured to receive a user-provided identification information, and the print-head manager is adapted to determine the print-head type based on the received user-provided identification.

20. The printing display unit of claim 15, wherein the modulation unit is further configured to retrieve at least one module based on the print-head type and to apply the at least one module to the at least one changeable portion of the user interface template.

21. The printing display unit of claim 20, wherein the at least one module provides a layout of graphical components and/or functionality of the at least one changeable portion of the user interface template.

22. The printing display unit of claim 20, wherein the at least one module provides at least one of data source, user operational, and/or user interface management functionality.

23. The printing display unit of claim 20, wherein the at least one module comprises at least one sub-module.

24. The printing display unit of claim 20, wherein the modulation unit is further configured to retrieve the at least one module from a database based on the print-head type.

25. The printing display unit of claim 20, wherein the modulation unit is further configured to retrieve the at least one module from a connecting print-head.

26. The printing display unit of claim 20, wherein the modulation unit is further configured to retrieve the at least one module from a user-provided source.

27. The printing display of claim 15, the printing display being configured to update said display portion to match how a laser in a laser printing technology generates marks on a substrate.

28. The printing display of claim 26, further being configured displaying a QR-code on the display a number of printed dots, reflecting how it is printed using laser technology.

29. An industrial printing system comprising a printing display unit comprising:
a print-head manager adapted to automatically determine:

a print-head type;
a utilized printing technology module;
a peripheral module;
obtaining from said print head information on one or several of technology type and capabilities, setting definition, fault and warning definitions, maintenance features and diagnostic features,
obtaining from said printing technology module information on one or several of module type and capabilities, setting definition, fault and warning definitions, maintenance features and diagnostic features, and
obtaining from said peripheral module information on one or several of module type and capabilities, setting definition, fault and warning definitions, maintenance features and diagnostic features,
a user interface template comprising at least one changeable portion; and
a modulation unit adapted to based on said obtained information automatically configuring at least one changeable portion of a user interface template based on the print-head type, utilized printing technology and print technology capability, wherein the at least one changeable portion is related to a display of a printing preview or a printing status wherein the modulation units is further configured to affect one or more graphical layout of a user interface, information viewed and/or provided by the user interface, user operational options, and/or data sources utilized by the user interface.

* * * * *